(12) United States Patent
Argenti

(10) Patent No.: US 10,721,122 B1
(45) Date of Patent: Jul. 21, 2020

(54) DISCOVERY OF DEVICE CAPABILITIES

(71) Applicant: Amazon Technologies, Inc., Seattle, WA (US)

(72) Inventor: Marco Argenti, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/242,918

(22) Filed: Jan. 8, 2019

Related U.S. Application Data

(63) Continuation of application No. 15/197,511, filed on Jun. 29, 2016, now Pat. No. 10,181,978.

(51) Int. Cl.
*H04L 12/24* (2006.01)
*H04L 29/08* (2006.01)

(52) U.S. Cl.
CPC .......... *H04L 41/0806* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 2014/0344420 | A1* | 11/2014 | Rjeili | H04L 43/04 709/220 |
| 2016/0088049 | A1* | 3/2016 | Seed | H04W 4/70 709/203 |
| 2017/0026974 | A1* | 1/2017 | Dey | H04W 4/025 |
| 2017/0155710 | A1* | 6/2017 | Quinn | H04L 67/1014 |

* cited by examiner

*Primary Examiner* — Diane L Lo
(74) *Attorney, Agent, or Firm* — Thorpe North & Western, LLP.

(57) ABSTRACT

Technology is described for sharing device capabilities between a plurality of Internet of Things (IoT) devices. A first IoT device within a localized network may identify a desired device capability that is capable of augmenting device capabilities of the first IoT device. The first IoT device may identify a second IoT device within the localized network that possesses the desired device capability. The first IoT device may identify the second IoT device using a registry of device capabilities stored in the localized network. The first IoT device may obtain access to the desired device capability of the second IoT device to augment the device capabilities of the first IoT device.

20 Claims, 11 Drawing Sheets

DISCOVERY OF DEVICE CAPABILITIES

PRIORITY DATA

This application is a continuation of U.S. patent application Ser. No. 15/197,511, filed on Jun. 29, 2016, which is incorporated herein by reference.

BACKGROUND

The Internet of Things (IoT) is the interconnection of computing devices scattered across the globe using the existing Internet infrastructure. IoT devices may be assigned a unique identifier, such as an Internet Protocol version 6 (IPv6) address, an IPv4 address, a uniform resource identifier (URI), or a global unique identifier. IoT devices may be able to capture IoT device data, and then the IoT devices may securely communicate the IoT device data over a network to a centralized IoT service in a service provider environment. In one example, the IoT service may perform various analytics on the IoT device data and provide additional functionality or supplemental data. For example, the IoT service may analyze streaming IoT device data and trigger alerts based on the analysis of the streaming IoT device data.

IoT devices may be embedded in a variety of physical devices or products, such as industrial equipment, farm machinery, home appliances, manufacturing devices, industrial printers, automobiles, thermostats, smart traffic lights, vehicles, buildings, etc. These physical devices may have embedded electronics, software, sensors, and network connectivity that enables these physical devices to collect and exchange data. IoT may be useful for a number of applications, such as environmental monitoring, farming, infrastructure management, industrial applications, building and home automation, energy management, medical and healthcare systems, transport systems, etc.

DETAILED DESCRIPTION

Figure 1:
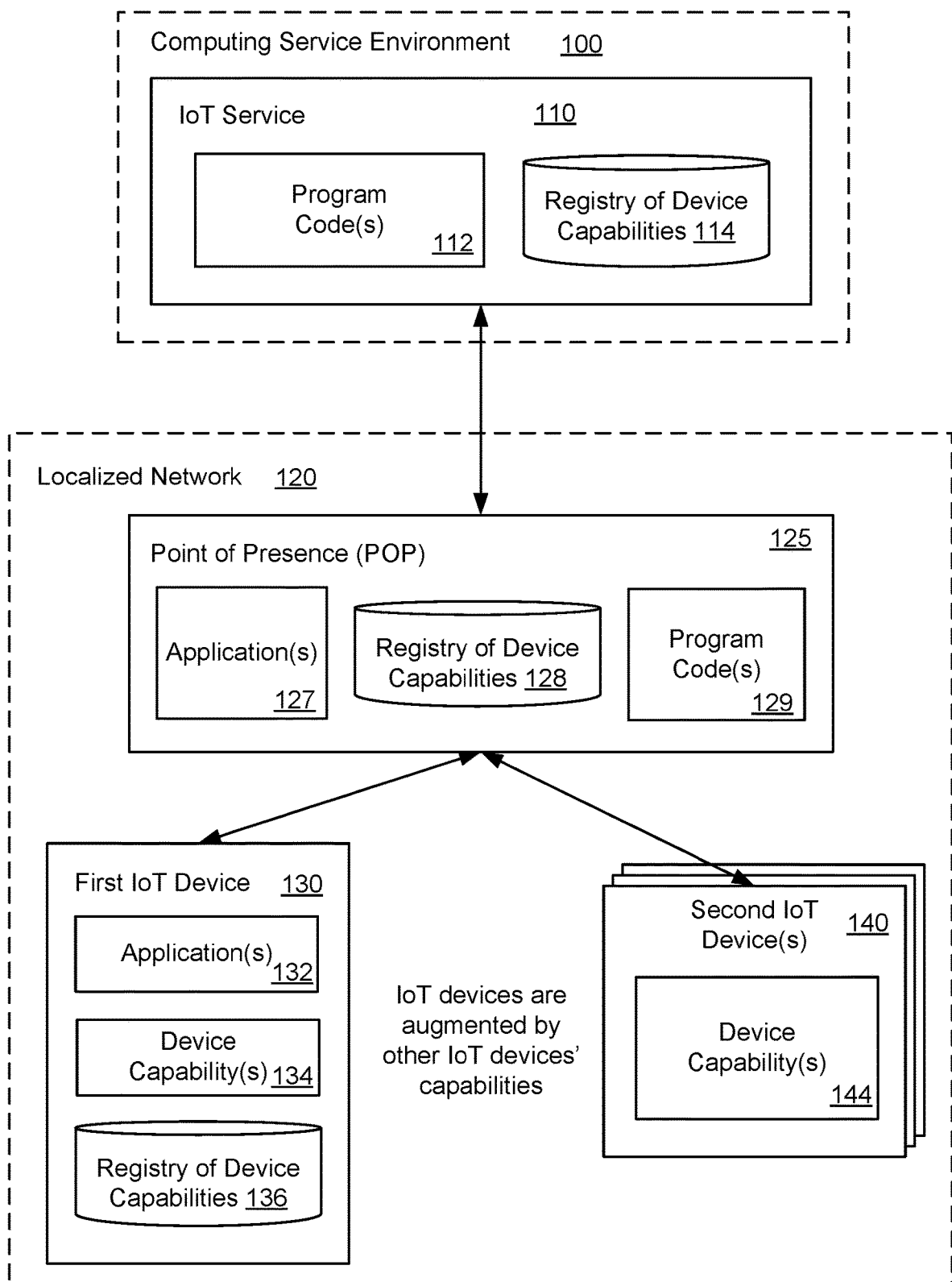
FIG. 1 illustrates a system and related operations for discovering and sharing device capabilities between a plurality of Internet of Things (IoT) devices within a localized network according to an example of the present technology.

A technology is described for sharing device capabilities between Internet of Things (IoT) devices. For a given IoT device, IoT device functionalities may be augmented by the device capabilities of other IoT devices within a same localized network. While a given IoT device may not natively have certain device capabilities, the IoT device may obtain access to such device capabilities or additional functionality and computing capacity through other IoT devices within a defined localized network (e.g., the same local area network, virtual local area network, or a campus area network, etc.). The localized network may span a relatively small area (e.g., a diameter of 200 meters), such as a room, a building or a group of buildings. The device capabilities of the IoT devices may include hardware and/or software capabilities (e.g., an image capturing capability, a video capturing capability, a microphone capability, a compute capability, a speaker capability, a capability to execute a certain type or size of application, or a sensor capability). By using a device capability discovery process between the IoT devices, each IoT device may enhance the functionality of surrounding IoT devices within the localized network.

In one example, a first IoT device within a localized network may execute an application using IoT device data captured at the first IoT device. The first IoT device may determine an additional desired type of data (i.e., in addition to the captured data) for consumption at the application. The desired type of data may serve to augment functionalities or data output at the first IoT device. For example, the desired type of data may enable the application to provide an enhanced output that may otherwise not be possible without access to the desired type of data. As non-limiting examples, the desired type of data may include audio data, video data, image data, temperature data, air quality data, motion detection data, etc. that the first IoT device is incapable of acquiring using native hardware and/or software installed at the first IoT device. As another example, the desired type of data may cause the first IoT device to perform certain operations (e.g., turn on, turn off, adjust settings), and these operations may not typically be performed based on the desired type of data since the first IoT device may not natively have the device capabilities to capture this data.

The first IoT device may identify a second IoT device within the localized network that possesses a device capability to provide the desired type of data to the application executing on the first IoT device. More specifically, the first IoT device may search a registry of device capabilities that contains the device capabilities for each of a plurality of IoT devices within the localized network. The registry of device capabilities may be locally stored at the first IoT device. Based on the search of the registry, the first IoT device may identify the second IoT device as having the device capability to provide the desired type of data. The first IoT device may send a request to access the device capability to the second IoT device, and the request may be generated and sent using application program interface (API) functions or messaging functions of the first IoT device. The first IoT device may receive a response from the second IoT device verifying that the second IoT device possesses the device capability to provide the desired type of data to the first IoT device. Further, the first IoT device may receive the desired type of data from the second IoT device for consumption by the application executing on the first IoT device.

In an alternative configuration, the first IoT device may determine that the registry of device capabilities does not identify IoT devices within the localized network that possess the device capability. In this scenario, the registry may be identified as being outdated, so the first IoT device may send the request to a plurality of IoT devices within the localized network. The first IoT device may not receive a response (or may receive a negative response or NAK (negative acknowledgement) when none of the IoT devices possess the device capability. On the other hand, if the second IoT device possesses the device capability, the first IoT device may receive a response from the second IoT device. The first IoT device may update the registry to indicate that the second IoT device possesses the device capability. After the first IoT device receives the response from the second IoT device, the first IoT device may receive the desired type of data from the second IoT device for consumption at the first IoT device.

In yet another alternative configuration, the first IoT device may identify the device capability to provide the desired type of data to the application executing on the first IoT device. The first IoT device may send a request for the device capability to an IoT service operating in a computing service environment. The IoT service may access a local registry of device capabilities. The local registry may include device capabilities for each of a plurality of IoT devices within the localized network. The IoT service may identify, from the local registry of device capabilities, the second IoT device within the localized network that possesses the device capability. The IoT service may forward the request for the device capability to the second IoT device. The second IoT device may be configured to connect to the first IoT device and send IoT device data in accordance with the device capability to the first IoT device, and the IoT device data may be consumed by the application executing on the first IoT device. In this configuration, rather than the first IoT device searching a local registry of device capabilities to discover the second IoT device, the first IoT device may request the IoT service to discover the second IoT device and trigger the second IoT device to connect to the first IoT device.

FIG. 1 illustrates an exemplary system and related operations for discovering and sharing device capabilities between a plurality of Internet of Things (IoT) devices within a localized network 120. An IoT service 110 may operate in a computing service environment 100. The IoT service 110 may be in communication with the plurality of IoT devices, such as a first IoT device 130 and a second IoT device 140. The IoT service 110 may communicate with the first IoT device 130 and the second IoT device 140 via a point of presence (POP) 125. The first IoT device 130, the second IoT device 140 and the POP 125 may be located within a localized network 120. The localized network 120 may span a relatively small area, such as a single building or a group of buildings. As a non-limiting example, the localized network 120 may span a diameter of 300 meters, cover a room, a building, or multiple building on a campus. The first IoT device 130, the second IoT device 140 and the POP 125 may communicate with each other within the localized network 120 using an appropriate wired or wireless standard, such as WiFi.

In one example, the IoT service 110 may execute program code(s) 112. The program code(s) 112 may execute in a container using a virtual machine, and the container may be associated with compute and storage resources located in the computing service environment 100. The container may run on one or more computing instances that operate in the computing service environment 100. IoT device data may be received by the program codes 112 via the IoT Service 110 from the first and/or second IoT devices 130, 140, and the program code(s) 112 may be executed to perform processing on the IoT device data. The processing of the IoT device data may produce an output, and the IoT service 110 may provide the output to the first and/or second IoT devices 130, 140. In addition, the IoT service 110 may maintain a registry of device capabilities 114. The registry of device capabilities 114 may indicate device capabilities 134, 144 corresponding to the first and second IoT devices 130, 140, respectively. The first IoT device 130 may locally store a registry of device capabilities 136, which may be a copy of the registry of device capabilities 114 stored in the computing service environment. In addition, a copy of the registry of device capabilities 114 may be stored on the POP 125.

In one example, the first IoT device 130 may execute one or more applications 132 using IoT device data captured at the first IoT device 130. The first IoT device 130 may determine a desired type of data to augment the data or the functionality of the application 132 executing on the first IoT device 130. The first IoT device 130 may search the registry of device capabilities 136 and discover that the second IoT device 140 possesses the device capability 144 to provide the desired type of data to the application 132 executing on the first IoT device 130. The first IoT device 130 and the second IoT device 140 may exchange request and response messages, and the second IoT device 140 may provide the desired type of data to the first IoT device 130. As a result, through the device capability discovery process between the first IoT device 130 and the second IoT device 140, the first IoT device 130 may obtain access to the device capability 144 of the second IoT device 140.

In one configuration, the POP 125 may execute one or more applications 127 and/or program code 129. The POP 125 may store a registry of device capabilities 128, which may be a copy of the registry of device capabilities 136 stored on the first IoT device 130. The POP 125 may have an increased computing capability as compared to the first IoT device 130, so rather than executing applications on the first IoT device 130, the applications 127 may be executed on the POP 125. The first IoT device 130 may provide the IoT device data captured at the first IoT device 130, as well as the desired type of data received from the second IoT device 140, to the POP 125 for consumption at the applications 127 executing at the POP 125. The POP 125 may execute the one or more applications 127 using the IoT device data and the desired type of data to produce an output, and the POP 125 may send the output to the first IoT device 130.

As a non-limiting example, the first IoT device 130 may be a controller to operate a heating, ventilating, and air conditioning (HVAC) system in a home. The first IoT device 130 may typically control the HVAC system based on temperature, but it may be desirable to control the HVAC system in response to detected air quality in the home. However, the first IoT device 130 may not natively include an air quality sensor to detect the air quality in the home. The first IoT device 130 may search the registry of device capabilities 136 for IoT devices within the localized network 120 which contain an air quality sensor. Based on the registry of device capabilities 136, the first IoT device 130 may determine that the second IoT device 140 (e.g., a security system) contains an air quality sensor. The first IoT device 130 may send a request for access to the air quality sensor to the second IoT device 140. The first IoT device 130 may generate and send the request using API calls or messaging functions. The second IoT device 140 may grant the first IoT device 130 access to the air quality sensor at the second IoT device 140. In other words, the second IoT device 140 may periodically provide air quality data to the first IoT device 130. Based on the air quality data (e.g., when the air quality is above or below a defined threshold), the first IoT device 130 may turn off or turn on the HVAC system to filter the air. As a result, the first IoT device 130 (e.g., the controller to operate the HVAC system) may be augmented to perform certain actions based on air quality data received from the second IoT device 140 (e.g., the security system).

As another non-limiting example, the first IoT device 130 may be a controller to operate a security system in a home. The first IoT device 130 may typically control the security system based on user input, but it may be desirable to automatically control the security system based on image data. For example, it may be desirable to turn on or turn off the security system when there are no people inside the home. As another example, it may be desirable to signal an alarm when unauthorized people are inside the home using facial recognition capabilities. However, the first IoT device 130 may not natively include a camera to capture images of the home. The first IoT device 130 may search the registry of device capabilities 136 for IoT devices within the localized network 120 that contain cameras. Based on the registry of device capabilities 136, the first IoT device 130 may identify multiple IoT devices within the home that possess cameras (e.g., a baby monitor, a pet camera, a smart television, a desktop computer). The first IoT device 130 may send requests to the multiple IoT devices to request access to image data generated by the other multiple IoT devices. The first IoT device 130 may receive responses from the multiple IoT devices and grant access to the image data.

Continuing with the non-limiting example, the first IoT device 130 may receive the image data from the multiple IoT devices. However, the first IoT device 130 may not natively include image processing software to process the images or perform facial recognition. Based on the registry of device capabilities 136, the first IoT device 130 may identify that the second IoT device 140 is capable of executing an image processing application for facial recognition or other types of image management. After a request and response exchange between the first and second IoT devices 130, 140, the first IoT device 130 may send the image data to the second IoT device 140 for image processing. The first IoT device 130 may then receive image processing output from the second IoT device 130. Based on the image processing output, the first IoT device 130 may determine when the home is empty and activate the security system. In addition, the second IoT device 140 may process the image data using a facial recognition application, and when the image processing output indicates that unauthorized people are detected in the home, the first IoT device 130 may signal the alarm. In this non-limiting example, the first IoT device 130 (e.g., the controller to operate the security system) may be augmented to perform security actions based on the image data received from the multiple IoT devices and the processing of the image data.

Figure 2:
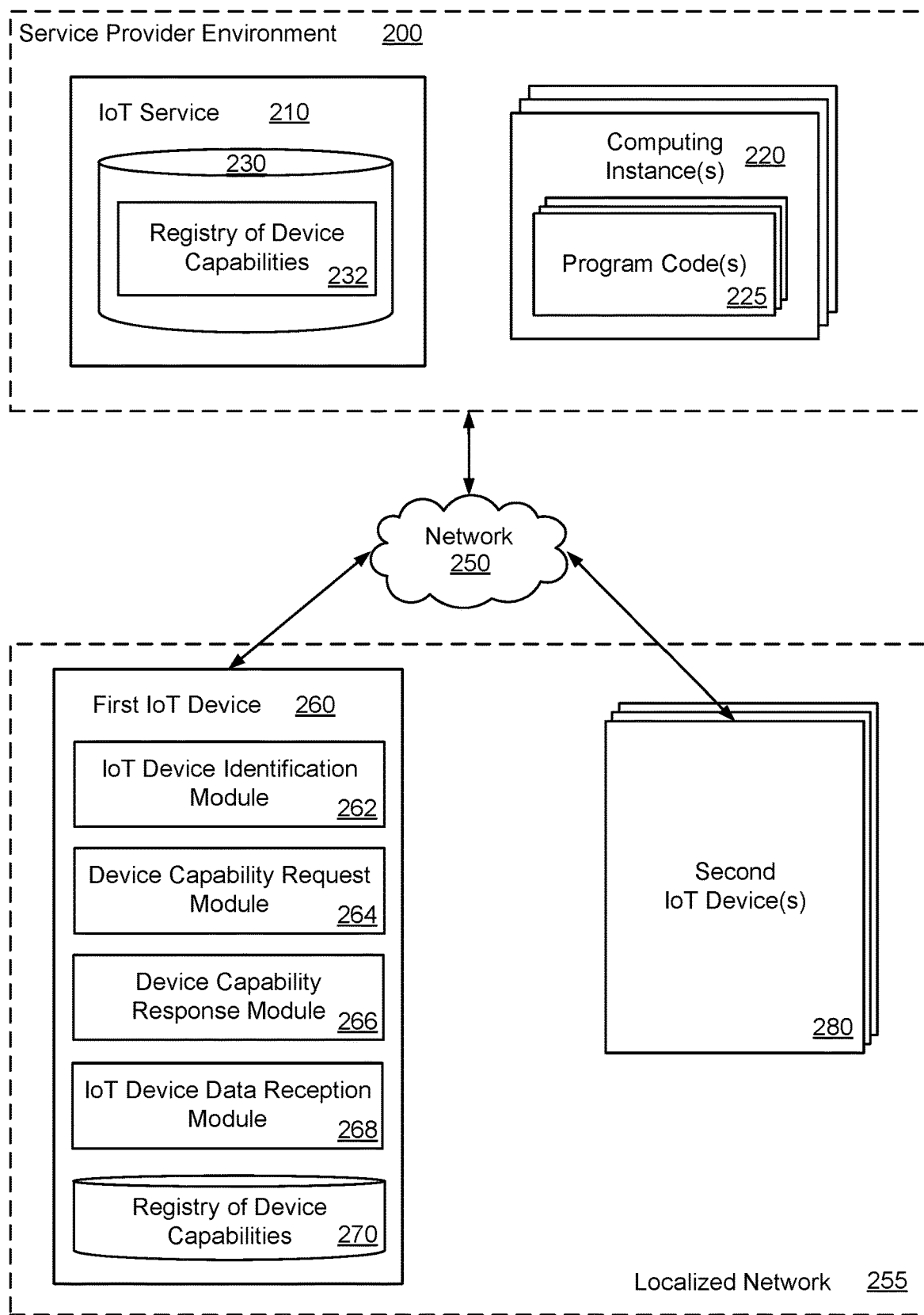
FIG. 2 is an illustration of a networked system for discovering and sharing device capabilities between a plurality of Internet of Things (IoT) devices according to an example of the present technology.

FIG. 2 illustrates components of an example service provider environment 200 according to one example of the present technology. The service provider environment 200 may include an Internet of Things (IoT) service 210. The IoT service 210 may be in communication with a number of first and second Internet of Things (IoT) devices 260, 280 via a network 250. The first and second IoT devices 260, 280 may be within a localized network 255. The IoT service 210 may have one or more computing instances 220 that run on the service provider environment 200. The computing instances 220 may execute program code(s) 225 in containers. The program code(s) 225 may utilize IoT device data received from the first and second IoT devices 260, 280, and provide an output to the first and second IoT devices 260, 280.

In one example, the IoT service 210 may maintain a data store 230 with a registry of device capabilities 232. The registry of device capabilities 232 may include a list of the first and second IoT devices 260, 280 within the localized network 255 and device capabilities for each of the first and second IoT devices 260, 280. The device capabilities may include hardware capabilities and/or software capabilities. As non-limiting examples, the registry of device capabilities 232 may indicate that a first IoT device within the localized network 255 possesses camera and microphone capabilities, a second IoT device within the localized network 255 possesses signal processing capabilities, a third IoT device within the localized network 255 possesses an application to perform image processing, etc. The registry of device capabilities 232 may be populated when the first and second IoT devices 260, 280 send responses that contain information about device capabilities to the IoT service 210. The registry of device capabilities 232 may be continually updated as the first and second IoT devices 260, 280 acquire new device capabilities or lose device capabilities, or when the first and second IoT devices 260, 280 within the localized network 255 join the localized network or go offline and become unavailable.

In one example, copies of the registry of device capabilities 232 may be stored locally at the first and second IoT devices 260, 280. For example, the first IoT device 260 may include a registry of device capabilities 270, which may be a copy of the registry of device capabilities 232 stored in the service provider environment 200. When changes are made to the registry of device capabilities 232 in the service provider environment 200, the copies of the registry of device capabilities 232 stored locally at the first IoT device 260 may be updated to reflect the changes using a gossip protocol or a peer to peer protocol.

The first IoT device 260 may contain a number of modules for discovering device capabilities of the second IoT devices 280 and obtaining access to the device capabilities of the second IoT devices 280. The first IoT device 260 may include an IoT device identification module 262, a device capability request module 264, a device capability response module 266, an IoT device data reception module 268, and other applications, services, processes, systems, engines, or functionality not discussed in detail herein.

The IoT device identification module 262 may be configured to determine a desired type of data for consumption at the first IoT device 260. For example, the desired type of data may augment functionalities at the first IoT device 260.

As non-limiting examples, the desired type of data may include audio data, video data, image data, temperature data, air quality data, motion detection data, etc. The IoT device identification module 262 may identify a second IoT device 280 within the localized network 255 that possesses a device capability to provide the desired type of data. The IoT device identification module 262 may identify the second IoT device 280 from the registry of device capabilities 270 maintained at the first IoT device 260.

In an alternative configuration, the IoT device identification module 262 may search the registry of device capabilities 270, but the registry of device capabilities 270 may not identify second IoT devices 280 that possess the device capability to provide the desired type of data. In this case, the device capability request module 264 may send a request for the device capability to a plurality of second IoT devices 280 within the localized network 255. After the request is transmitted to the plurality of second IoT devices 280, the device capability response module 266 may receive a response from second IoT devices 280 indicating possession of the device capability. The registry of device capabilities 270 may be updated to reflect the second IoT devices 280 that possess the device capability. The IoT device data reception module 268 may receive the desired type of data from the second IoT devices 280 for consumption at the first IoT device 260.

The device capability request module 264 may be configured to send a request to access the device capability to the second IoT device 280 within the localized network 255. As previously described, the second IoT device 280 may be identified as possessing the device capability from the registry of device capabilities 270. The device capability request module 264 may generate and send the request using application program interface (API) calls or messaging functions from the first IoT device 260. The request to access the device capability may use a JavaScript Object Notation (JSON) object or format. The device capability request module 264 may send the request directly to the second IoT device 280 or via the IoT service 210.

The device capability response module 266 may receive a response from the second IoT device 280 verifying that the second IoT device 280 possesses the device capability to provide the desired type of data to the first IoT device 260. In other words, after the second IoT device 280 receives the request, the second IoT device 280 may confirm that the second IoT device 280 is capable of providing the desired type of data. The response may use a JavaScript Object Notation (JSON) format. The device capability response module 266 may receive the response directly to the second IoT device 280 or via the IoT service 210.

The IoT device data reception module 268 may be configured to receive the desired type of data for consumption at the first IoT device 260. The desired type of data may be transmitted from the second IoT device 280 after a request-response mechanism is completed between the first and second IoT devices 260, 280. For example, the desired type of data may be consumed at the application executing on the first IoT device 260. The desired type of data may enable the application executing on the first IoT device 260 to produce an enhanced output. In other words, the first IoT device 260 may produce an output that would otherwise not be possible without the desired type of data. In addition, the first IoT device 260 may perform various actions based on the desired type of data, such as turning on the first IoT device 260, turning off the first IoT device 260, adjusting settings, generating an alarm, etc. The desired type of data may be received in accordance with a one-time request, or alternatively, the data may be periodically received as a stream.

In one configuration, the second IoT device 280 may include, similar to the first IoT device 260, an IoT device identification module, a device capability request module, a device capability response module, an IoT device data reception module and a registry of device capabilities. In other words, the second IoT device 280 may possess functionalities that are similar to those described for the first IoT device 260.

The first and second IoT devices 260, 280 may comprise, for example processor-based systems such as computing systems. As non-limiting examples, the first and second IoT devices 260, 280 may include consumer products (e.g., rice cookers, televisions, printers, or scanners), home automation products (e.g., smart thermostats, smart refrigerators, washing machines, security cameras, heating, air conditioning, etc.), manufacturing devices, farming devices, factory devices, industrial metal stamping devices, industrial robots, sensors, drones, or other devices that are assigned unique identifiers and are capable of communicating data over the network 250. Commercial devices may also be included in the definition of the first and second IoT devices 260, 280, including: commercial printing presses, commercial freezers, commercial kilns, commercial mixers or other commercial equipment.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 250 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3A:
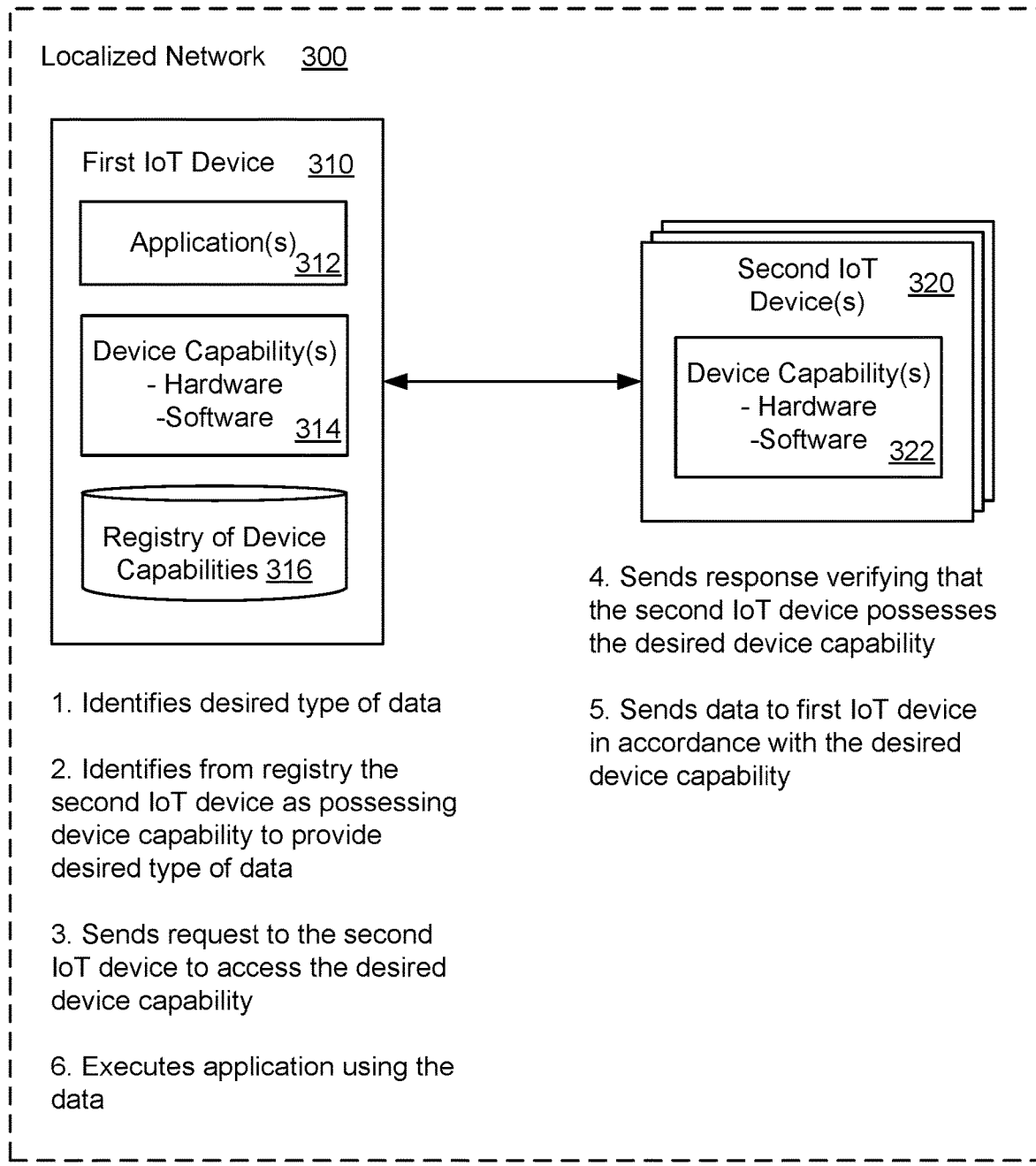
FIG. 3A illustrates a system and related operations for discovering device capabilities using a registry of device capabilities and sharing the device capabilities between Internet of Things (IoT) devices within a localized network according to an example of the present technology.

FIG. 3A illustrates an exemplary system and related operations for discovering device capabilities 322 using a registry of device capabilities 316 and sharing the device capabilities 322 between Internet of Things (IoT) devices, such as a first IoT device 310 and a second IoT device 320. The first IoT device 310 and the second IoT device 320 may be within a localized network 300. The first IoT device 310 and the second IoT device 320 may communicate with each other within the localized network 300 using an appropriate wired or wireless protocol, such as Ethernet, Bluetooth, WiFi, etc. The first IoT device 310 may execute one or more applications 312 using IoT device data captured at the first IoT device 310. The first IoT device 310 may possess one or more device capabilities 314, such as hardware and/or software capabilities. In addition, the first IoT device 310 may maintain a registry of device capabilities 316, which may include the device capabilities 322 corresponding to a plurality of IoT devices (including the second IoT device 320).

In step 1, the first IoT device 310 may determine a desired type of data for consumption at the application 312. The desired type of data may serve to augment functionalities at the first IoT device 310. For example, the desired type of data may enable the application 312 to provide an enhanced output that would otherwise not be possible without access to the desired type of data. As another example, the desired type of data may enable the first IoT device 310 to perform certain operations (e.g., turn on, turn off, adjust settings), and these operations may not typically be performed at the first IoT device 310 using the desired type of data.

In step 2, the first IoT device 310 may search the registry of device capabilities 316 to identify IoT devices within the localized network 300 that possess the device capability. Based on the search of the registry of device capabilities 316, the first IoT device 310 may identify the second IoT device 320 as having the device capability 322 to provide the desired type of data to the first IoT device 310.

In step 3, the first IoT device 310 may send a request to access the device capability 322 to the second IoT device 320. The request may be generated and sent using application program interface (API) calls from the first IoT device 310 or messaging functions of the first IoT device 310. The request for the device capability 322 may use a JavaScript Object Notation (JSON) format or an Extensible Markup Language (XML) format.

In step 4, the second IoT device 320 may send a response to the first IoT device 310 verifying that the second IoT device 320 possesses the device capability 322 to provide the desired type of data to the first IoT device 310. The response may acknowledge that the second IoT device 320 will provide the desired type of data to the first IoT device 310. The response may use a JavaScript Object Notation (JSON) format or an Extensible Markup Language (XML) format. In addition, the first IoT device 310 may send the request and the second IoT device 320 may send the response using a common API call model, which may enable the first IoT device 310 and the second IoT device 320 to communicate with each other.

In step 5, the second IoT device 320 may capture the desired type of data in accordance with the device capability 322, and the second IoT device 320 may send the desired type of data to the first IoT device 310. As non-limiting examples, the desired type of data may include audio data, video data, image data, temperature data, air quality data, motion detection data, etc.

In step 6, the first IoT device 310 may execute the application 312 using the desired type of data received from the second IoT device 320. As previously described, the application 312 may provide an enhanced output that would otherwise not be possible without access to the desired type of data. Alternatively, the first IoT device 310 may perform certain functionalities using the desired type of data received from the second IoT device 320.

In one example, the first IoT device 310 may capture IoT device data, but the first IoT device 310 may not possess suitable compute capabilities to process and analyze the IoT device data. The first IoT device may identify, from the registry of device capabilities 316, that the second IoT device 320 executes an application capable of manipulating the IoT device data captured at the first IoT device 310. In other words, an ability to execute the application at the second IoT device 320 may be the desired device capability. After a request and response exchange between the first IoT device 310 and the second IoT device 320, the first IoT device 310 may provide the IoT device data to the second IoT device 320 for consumption at the application executing on the second IoT device 320. The application may produce an output based on the IoT device data. The second IoT device 320 may send the output to the first IoT device 310, and based on the output, the first IoT device 310 may perform one or more operations. In this example, certain IoT devices within the localized network 300 may perform data processing and data analysis on behalf of other IoT devices that do not natively have such capabilities.

Figure 3B:
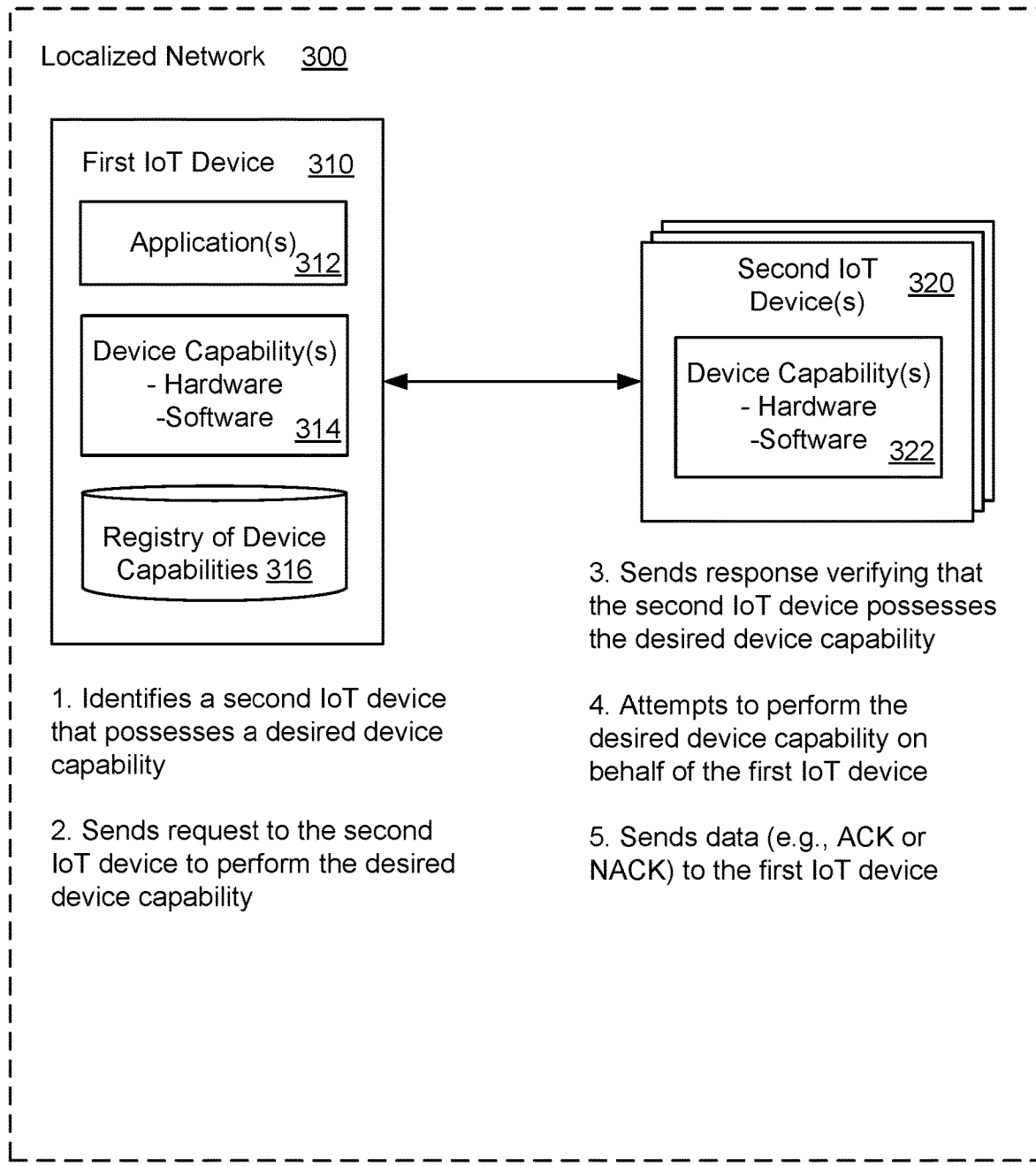
FIG. 3B illustrates a system and related operations for discovering device capabilities using a registry of device capabilities and sharing the device capabilities between Internet of Things (IoT) devices within a localized network according to an example of the present technology.

FIG. 3B illustrates an exemplary system and related operations for discovering device capabilities 322 using a registry of device capabilities 316 and sharing the device capabilities 322 between Internet of Things (IoT) devices, such as a first IoT device 310 and a second IoT device 320. The first IoT device 310 and the second IoT device 320 may be within a localized network 300. The first IoT device 310 may execute one or more applications 312, and the first IoT device 310 may possess one or more device capabilities 314, such as hardware and/or software capabilities. In addition, the first IoT device 310 may maintain a registry of device capabilities 316, which may include the device capabilities 322 corresponding to a plurality of IoT devices (including the second IoT device 320).

In step 1, the first IoT device 310 may identify a second IoT device 320 that possesses a device capability 322. The device capability 322 may include an ability of the second IoT device 320 to perform a specific function or command. The performance of the device capability 322 at the second IoT device 320 may be beneficial or advantageous to the first IoT device 310. Non-limiting examples may include turning on a device (e.g., light, HVAC system, garage door), turning off a device, activating an actuator or a motor within a device, performing a specific task (e.g., take a picture, make a recording, record a video), etc. The first IoT device 310 may identify the second IoT device 320 using the registry of device capabilities 316.

In step 2, the first IoT device 310 may send, via an application 312 executing on the first IoT device 310, a request to the second IoT device 320 to perform the device capability 322. The request to perform the device capability 322 may use a JavaScript Object Notation (JSON) format.

In step 3, the second IoT device 320 may send a response to the first IoT device 310 verifying that the second IoT device 320 has the ability to perform the device capability 322. The response may use a JavaScript Object Notation (JSON) format.

In an alternative configuration, the first IoT device 310 may determine that the registry of device capabilities 316 does not include any IoT devices with the device capability, so the first IoT device 310 may broadcast a request for the device capability to a plurality of second IoT device 320. The second IoT device 320 may send a response to the first IoT device 310 verifying that the second IoT device 320 has the ability to perform the device capability 322.

In step 4, the second IoT device 320 may attempt to perform the device capability 322. The second IoT device 320 may attempt to perform the device capability 322 on behalf of the application 312 executing on the first IoT device 310. In other words, the first IoT device 310 may not possess this specific device capability, so the second IoT device 320 may attempt to perform the device capability 322 for the first IoT device 310.

In step 5, the second IoT device 320 may send data (e.g., a response or completed data) to the first IoT device 310 after attempting to perform the device capability 322. For example, the second IoT device 320 may send an acknowledgement (ACK) when the second IoT device 320 successfully performs the device capability 322. On the other hand, the second IoT device 320 may send a negative acknowledgement (NACK) when the second IoT device 320 is unsuccessful in performing the device capability 322 for the first IoT device 310. The first IoT device 310 may receive the data, and the data may be consumed at the application 312 executing on the first IoT device 310.

Figure 4:
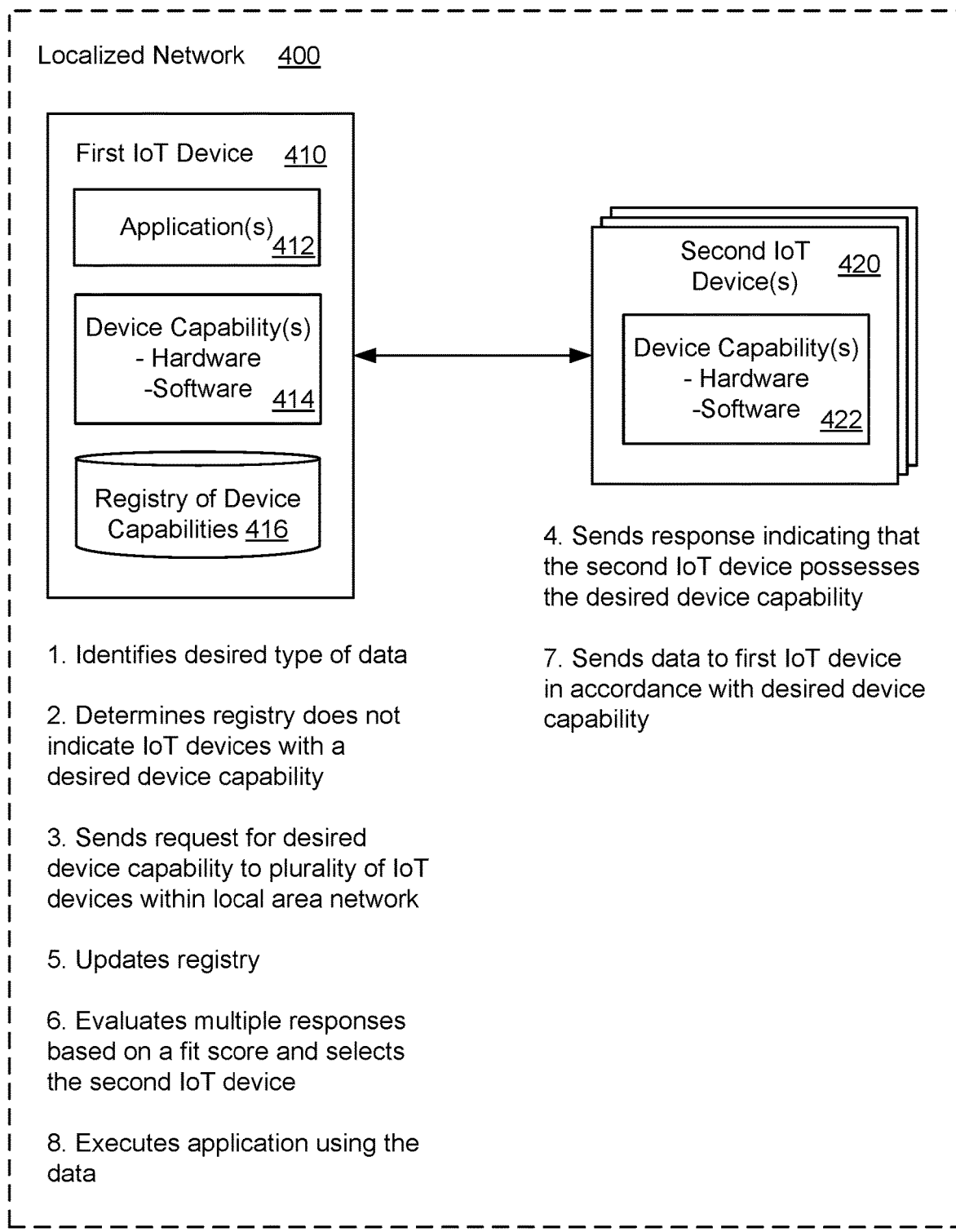
FIG. 4 illustrates a system and related operations for discovering device capabilities and sharing the device capabilities between Internet of Things (IoT) devices within a localized network according to an example of the present technology.

FIG. 4 illustrates an exemplary system and related operations for discovering device capabilities 422 and sharing the device capabilities 422 between Internet of Things (IoT) devices, such as a first IoT device 410 and a second IoT device 420. The first IoT device 410 and the second IoT device 420 may be within a localized network 400. The first IoT device 410 may execute one or more applications 412 using IoT device data captured at the first IoT device 410. In addition, the first IoT device 410 may possess one or more device capabilities 414, such as hardware and/or software capabilities.

In step 1, the first IoT device 410 may determine a desired type of data for consumption at the application 412. As described above, the desired type of data may serve to augment functionalities at the first IoT device 410.

In step 2, the first IoT device 410 may search a registry of device capabilities 416 to identify IoT devices within the localized network 400 that possess the device capability to provide the desired type of data to the first IoT device 410. Based on the search of the registry of device capabilities 416, the first IoT device 410 may determine that the registry does not currently identify any IoT devices within the localized network 400 which possess the device capability to provide the desired type of data.

In step 3, the first IoT device 410 may send a request for the device capability to a plurality of IoT devices within the localized network 400. In other words, the registry of device capabilities 414 may not indicate IoT devices that possess the device capability because the registry of device capabilities 414 may be outdated, so the first IoT device 410 may send the request to the plurality of IoT devices. The first IoT device 410 may send the request on a defined channel, such as a device capability request channel. In one specific example, the first IoT device 410 may broadcast the request within the localized network 400. The request may use a JavaScript Object Notation (JSON) format.

In step 4, the second IoT device 420 may send a response to the first IoT device 410 indicating that the second IoT device 420 possesses the device capability 422 to provide the desired type of data to the first IoT device 410. The response may use a JavaScript Object Notation (JSON) format.

In step 5, the first IoT device 410 may update the registry of device capabilities 416 to indicate that the second IoT device 420 possesses the device capability 422 to provide the desired type of data to the first IoT device 410. Therefore, when the first IoT device 410 is to obtain the desired type of data at a later time, the first IoT device 410 may automatically send the request to the second IoT device 420 in accordance with the registry of device capabilities 416. If the second IoT device 420 does not respond to the request within a predefined period of time or responds with a negative acknowledgement (ACK) to indicate that the second IoT device 420 no longer possesses the device capability, the first IoT device 410 may update the registry of device capabilities 416 to indicate that the second IoT device 420 no longer possesses the device capability, and the first IoT device 410 may resend the request to a plurality of IoT devices within the localized network 400.

In step 6, the first IoT device 410 may receive multiple responses from multiple IoT devices when the request is sent to the plurality of IoT devices within the localized network 400. In other words, multiple IoT devices may claim to possess the device capability requested by the first IoT device 410. The multiple responses may include details regarding the device capabilities of the multiple IoT devices. The first IoT device 410 may assign a fit score to each of the multiple IoT devices based on a correlation between the desired type of data and the details regarding device capabilities. The first IoT device 410 may select one of the multiple IoT devices to receive the desired type of data based on the fit score. For example, the first IoT device 410 may select the second IoT device 420 based on the fit score. The fit score may be based on a version of the desired device capability (e.g., old versions may be less desirable), an amount of compute power, an amount of memory contained by the device, network latency of the device and other factors. The fit score may be a summation or multiplication of ratings for factors describing the IoT device.

As a non-limiting example, the multiple responses from the multiple IoT devices may be regarding a camera capability for each of the multiple IoT devices. Each response may include specific details about the camera capability for a particular IoT device, such as resolution, location within a home, battery level, etc. Based on the specific details corresponding to each response, the first IoT device 410 may assign a fit score to each IoT device based on a respective camera capability. One or more IoT devices may be selected based on the fit score (e.g., based on highest score).

In step 7, the second IoT device 420 may capture the desired type of data in accordance with the device capability 422, and the second IoT device 420 may send the desired type of data to the first IoT device 410.

In step 8, the first IoT device 410 may execute the application 412 using the desired type of data received from the second IoT device 420. The application 412 may provide an enhanced output based on the desired type of data received from the second IoT device 420.

Figure 5:
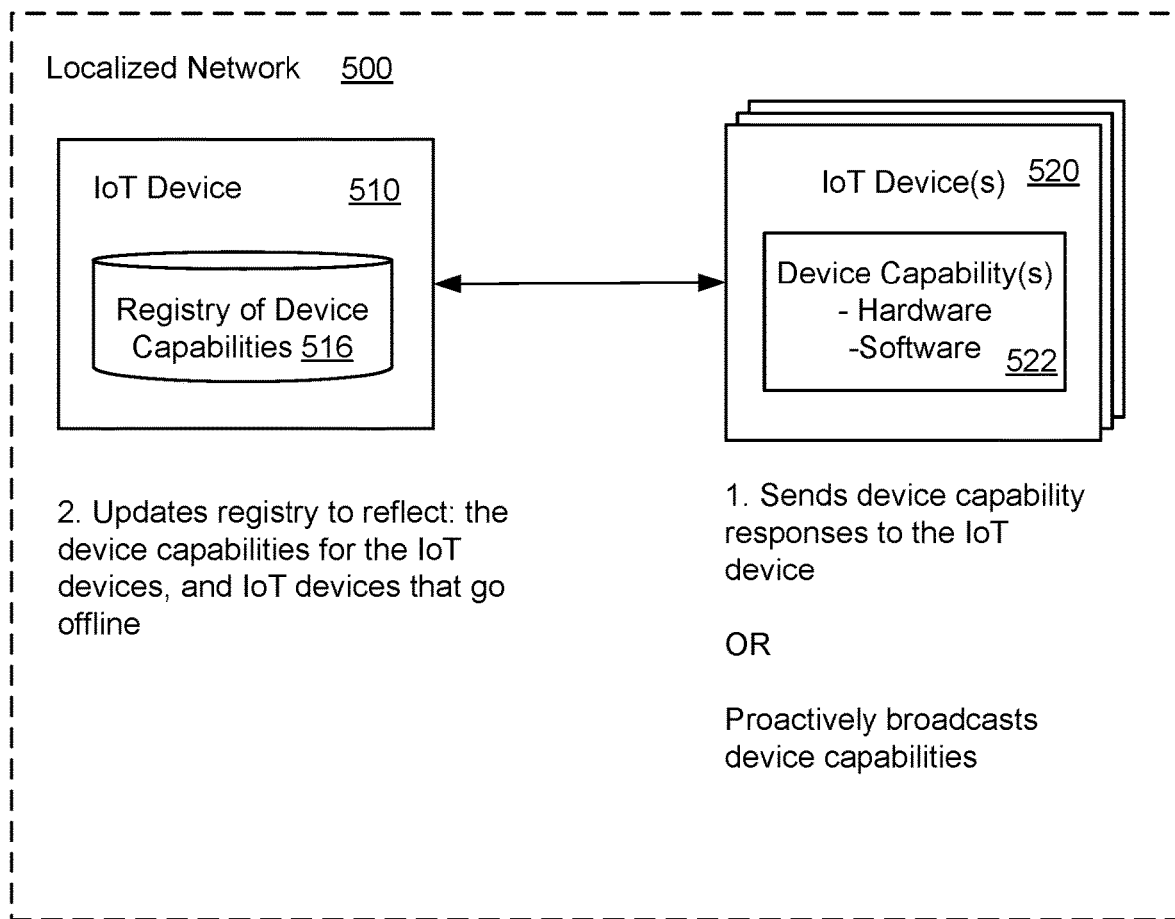
FIG. 5 illustrates a system and related operations for updating a registry of device capabilities according to an example of the present technology.

FIG. 5 illustrates an exemplary system and related operations for updating a registry of device capabilities 516. An Internet of Things (IoT) device 510 and a plurality of IoT devices 520 may reside in a localized network 500. The IoT device 510 may maintain the registry of device capabilities 516, which may include device capabilities 522 corresponding to the plurality of IoT device 520.

In step 1, the plurality of IoT devices 520 may send a plurality of responses to the IoT device 510. The responses may be in response to requests for device capabilities sent to the plurality of IoT devices 520. The responses may indicate device capabilities 522 possessed by the plurality IoT devices 520 to provide desired types of data to other IoT devices within the localized network 500. For example, a first IoT device may send a first response indicating possession of camera and microphone capabilities, a second IoT device may send a second response indicating possession of signal processing capabilities, a third IoT device may send a third response indicating possession of an application to perform image processing, etc. Therefore, the IoT device 510 may detect responses transmitted from the plurality of IoT devices 520 within the localized network 500.

In step 2, the IoT device 510 may update the registry of device capabilities 516 to reflect the device capabilities 522 possessed by the plurality of IoT devices 520. In other words, the IoT device 510 may receive the responses from the plurality of IoT devices 520, and the IoT device 510 may populate the registry of device capabilities 516 to reflect the device capabilities 522 corresponding to the plurality of IoT devices 520. The IoT device 510 may update the registry of device capabilities 516 to reflect new device capabilities 522 corresponding to the plurality of IoT devices 520. The IoT device 510 may update the registry of device capabilities 516 when IoT devices from the plurality of IoT devices 520 lose device capabilities 522. The IoT device 510 may update the registry of device capabilities 516 to reflect IoT devices from the plurality of IoT devices 520 that go offline and become unavailable. Therefore, the registry of device capabilities 516 may continually be updated to reflect the current state of device capabilities 522 corresponding to the IoT devices within the localized network 500.

In one example, the plurality of responses that contain the device capabilities 522 may be formatted in accordance with a common set of semantics. Alternatively, the responses may be formatted with different semantics, but the IoT device 510 may translate the device capabilities 522 into a common format prior to updating the registry of device capabilities 516 to reflect the device capabilities 522.

In an alternative configuration, the plurality of IoT devices 520 may proactively broadcast their respective device capabilities 522 within the localized network 500. For example, the plurality of IoT devices 520 may periodically broadcast their respectively device capabilities 522 without being promoted by a device capability request. The IoT device 510 may detect the device capabilities 522 for each of the plurality of IoT devices 520, and the IoT device 510 may update the registry of device capabilities 516 to reflect the device capabilities 522 possessed by the plurality of IoT devices 520.

Figure 6:
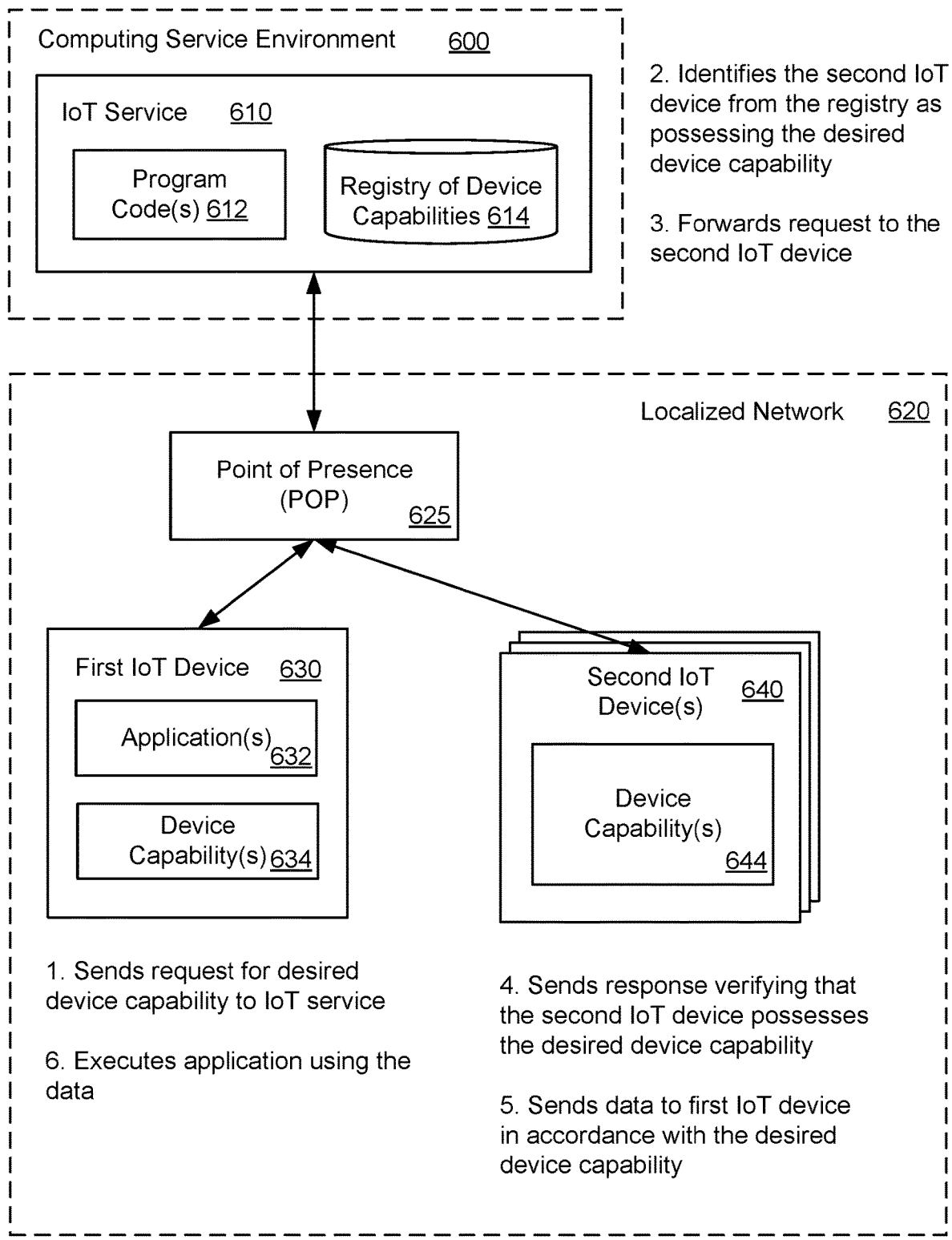
FIG. 6 illustrates a system and related operations for discovering device capabilities within a localized network via an Internet of Things (IoT) service in a computing service environment according to an example of the present technology.

FIG. 6 illustrates an exemplary system and related operations for discovering device capabilities 644 within a localized network 620 via an Internet of Things (IoT) service 610 in a computing service environment 600. The IoT service 610 may be in communication with a plurality of IoT devices, such as a first IoT device 630 and a second IoT device 640. The IoT service 610 may communicate with the first IoT device 630 and the second IoT device 640 via a point of presence (POP) 625. The first IoT device 630, the second IoT device 140 and the POP 125 may be located within the localized network 120. The IoT service 610 may execute program code(s) 612, which may process IoT device data received from the first and/or second IoT devices 630, 640 and provide an output to the first and/or second IoT devices 630, 640. In addition, the IoT service 610 may maintain a registry of device capabilities 614. The registry of device capabilities 614 may indicate device capabilities 634, 644 corresponding to the first and second IoT devices 630, 640, respectively.

In step 1, the first IoT device 630 may send a request for a device capability to the IoT service 610. The device capability may be capable of providing IoT device data to an application 632 that is executing on the first IoT device 630. The consumption of the IoT device data may augment a functionality of the application 632 executing on the first IoT device 630.

In step 2, the IoT service 610 may search the registry of device capabilities 614 to identify IoT devices within the localized network 620 that possess the device capability to provide the desired type of data to the first IoT device 630. Based on the search of the registry of device capabilities 614, the IoT service 610 may identify the second IoT device 640 as having the device capability 644 to provide the desired type of data to the first IoT device 630.

In step 3, after identifying the second IoT device 640 from the registry of device capabilities 614 (which is maintained at the IoT service 610), the IoT service 610 may forward the request for the device capability 644 to the second IoT device 640.

In step 4, the second IoT device 640 may send a response to the first IoT device 630 verifying that the second IoT device 640 possesses the device capability 644 to provide the desired type of data to the first IoT device 630.

In step 5, the second IoT device 640 may capture the desired type of data in accordance with the device capability 644, and the second IoT device 640 may send the desired type of data to the first IoT device 630.

In step 6, the first IoT device 630 may execute the application 632 using the desired type of data received from the second IoT device 640. The application 632 may provide an enhanced output based on the desired type of data received from the second IoT device 640.

In this configuration, the device capability discovery between the first IoT device 630 and the second IoT device 640 may be facilitated by the IoT service 610. In other words, rather than the first IoT device 630 and the second IoT device 640 directly discovering each other, the IoT service 610 may identify the second IoT device 640 from the registry of device capabilities 614 on behalf of the first IoT device 630.

Figure 7:
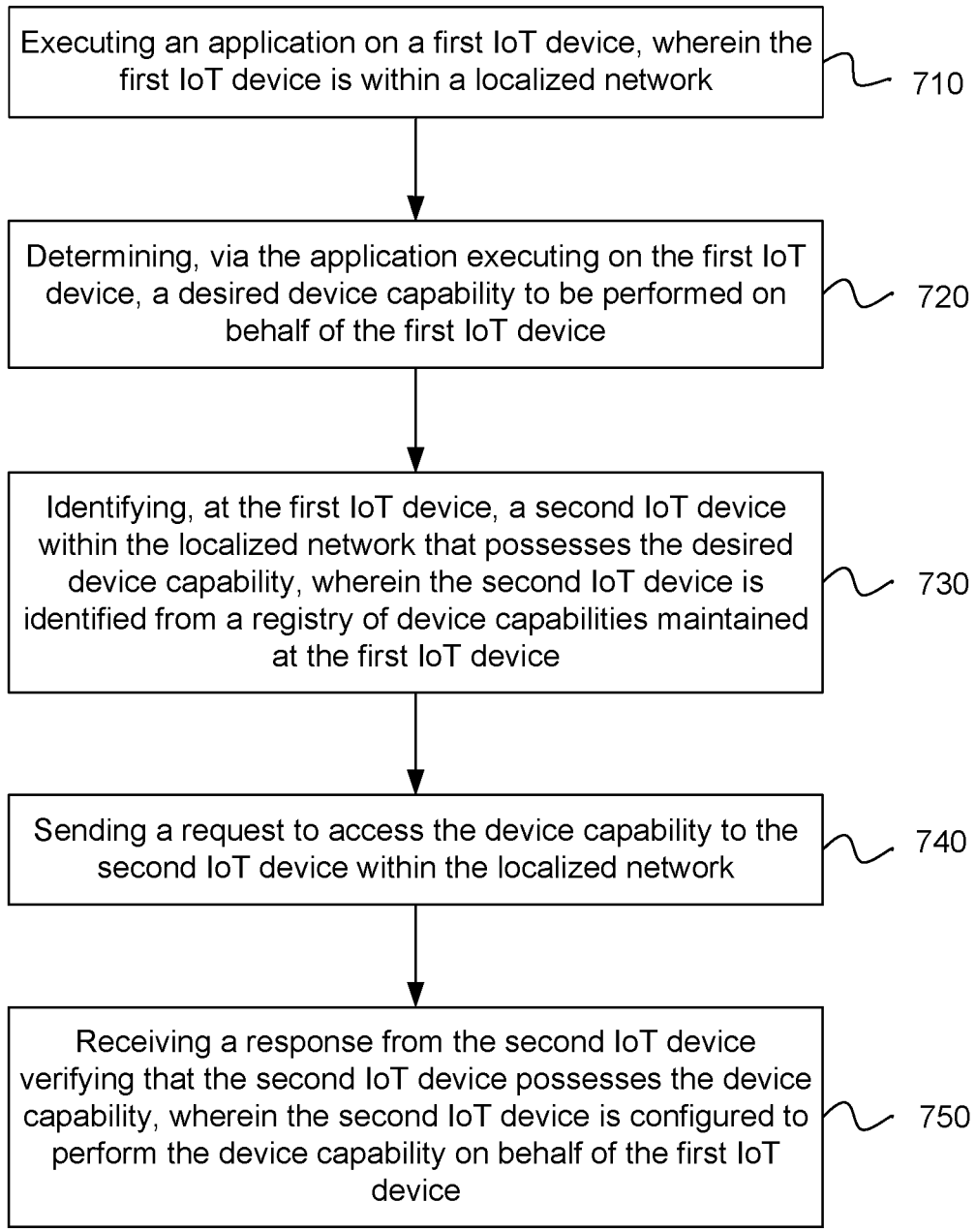
FIG. 7 is a flowchart of an example method for sharing device capabilities between Internet of Things (IoT) devices.

FIG. 7 illustrates an example of a method for sharing device capabilities between Internet of Things (IoT) devices. An application may be executed on a first IoT device within a localized network, as in block 710. Alternatively, program code (as opposed to an application) may be executed on the first IoT device. A functionality of the application may be dependent on a type of IoT device. As non-limiting examples, the application may be directed to a washing machine, security system, smart refrigerator, television, etc.

A desired device capability to be performed on behalf of the first IoT device may be determined, as in block 720. The desired device capability may be determined using the application executing on the first IoT device.

A second IoT device within the localized network may be identified that possesses the device capability, as in block 730. The second IoT device may be identified from a registry of device capabilities maintained at the first IoT device. The registry of device capabilities may include a list of IoT devices within the localized network and device capabilities corresponding to each of the IoT devices.

A request to access the device capability may be sent to the second IoT device within the localized network, as in block 740. The request may be generated and sent using application program interface (API) calls or messaging functions from the first IoT device. The request for the device capability may use a JavaScript Object Notation (JSON) format or an Extensible Markup Language (XML) format.

A response may be received from the second IoT device verifying that the second IoT device possesses the device capability, as in block 750. In one example, the response may be received from the second IoT device in accordance with a service level agreement (SLA). The SLA may be defined based on a type of device capability requested by the first IoT device. In one example, the second IoT device may be configured to perform the device capability on behalf of the first IoT device.

In one example, the first IoT device may receive an acknowledgement (ACK) when the second IoT device successfully performs the device capability on behalf of the first IoT device. In another example, the first IoT device may receive a negative acknowledgement (NACK) when the second IoT device is not successful in performing the device capability on behalf of the first IoT device. Other types of data may be received at the first IoT device, if such data is produced by the device capability or function.

In one example, the request may be sent to a plurality of IoT devices within the localized network when the registry of device capabilities does not identify IoT devices that possess the desired device capability. Based on the request transmitted to the plurality of IoT devices, the response may be received from the second IoT device.

In one example, multiple responses may be received from multiple IoT devices when the request is sent to the plurality of IoT devices within the localized network. The multiple responses may include details regarding device capabilities of the multiple IoT devices. A fit score may be assigned to each of the multiple IoT devices based on the details regarding device capabilities. One of the multiple IoT devices may be selected to perform the device capability on behalf of the first IoT device.

In one example, device capability information may be received from a plurality of IoT devices within the localized network. The registry of device capabilities may be populated to reflect the device capability information. The registry of device capabilities may be updated to reflect new device capabilities or IoT devices within the localized network that go offline.

Figure 8:
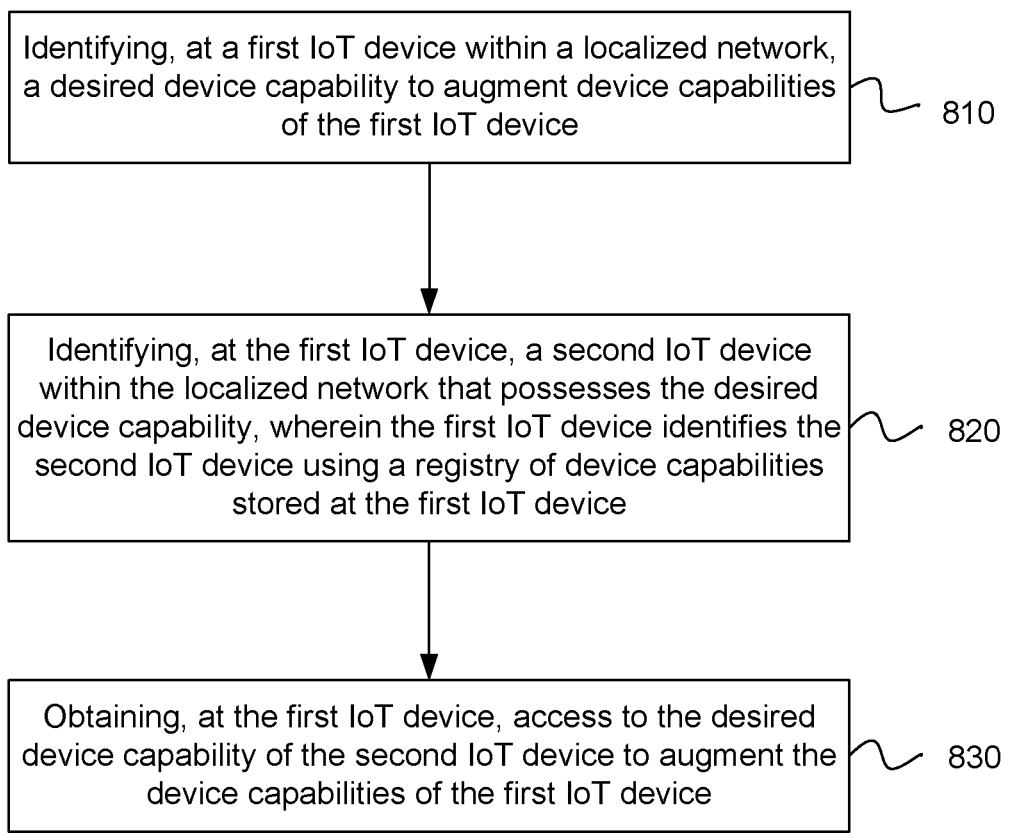
FIG. 8 is a flowchart of another example method for sharing device capabilities between Internet of Things (IoT) devices.

FIG. 8 illustrates an example of a method for sharing device capabilities between a plurality of Internet of Things (IoT) devices. A desired device capability to augment device capabilities of a first IoT device may be identified at the first IoT device, as in block 810. The first IoT device may identify the desired device capability, and the first IoT device may be within a localized network. The desired device capability may be a hardware capability and/or a software application capability. For example, the desired device capability may be one of: an image capturing capability, a video capturing capability, a microphone capability, a compute capability or a sensor capability.

A second IoT device within the localized network may be identified that possesses the desired device capability, as in block 820. The first IoT device may identify the second IoT device as possessing the desired device capability. In one example, the first IoT device may identify the second IoT device as possessing the desired device capability based on a registry of device capabilities stored at the first IoT device and/or in the localized network. The registry may include the device capabilities for each of a plurality of IoT devices within the localized network. Alternatively, a request for the desired device capability may be generated and sent from the first IoT device to a plurality of IoT devices within the localized network when the registry of device capabilities does not identify IoT devices that possess the desired device capability. The first IoT device may receive a response from the second IoT device indicating that the second IoT device possesses the desired device capability.

Access to the desired device capability of the second IoT device may be obtained at the first IoT device to augment the device capabilities of the first IoT device, as in block 830. The first IoT device may receive IoT device data captured at the second IoT device in accordance with the desired device capability. An application may be executed on the first IoT device that consumes the IoT device data.

In one example, the first IoT device may send a request for the desired device capability to the second IoT device when a registry of device capabilities indicates that the second IoT device possesses the desired device capability. The first IoT device may resend the request to a plurality of IoT devices within the localized network when the second IoT device does not respond to the request from the first IoT device within a predefined period of time.

In one example, the first IoT device may identify, from a registry of device capabilities, that the second IoT device executes an application capable of manipulating IoT device data captured at the first IoT device. An ability to execute the application at the second IoT device may be the desired device capability. The first IoT device may provide the IoT device data to the second IoT device for consumption at the application executing on the second IoT device. The application may produce an output based on the IoT device data. The first IoT device may receive from the second IoT device the output for consumption at the first IoT device.

In one example, a registry of device capabilities maintained at the first IoT device may be populated based on device capability information received from a plurality of IoT devices within the localized network. In another example, copies of a registry of device capabilities may be locally stored in each of a plurality of IoT devices within the localized network, and a master copy of the registry of device capabilities may be stored in a computing service environment. The copies of the registry of device capabilities may be synchronized, such that each registry of device capabilities is up-to-date.

Figure 9:
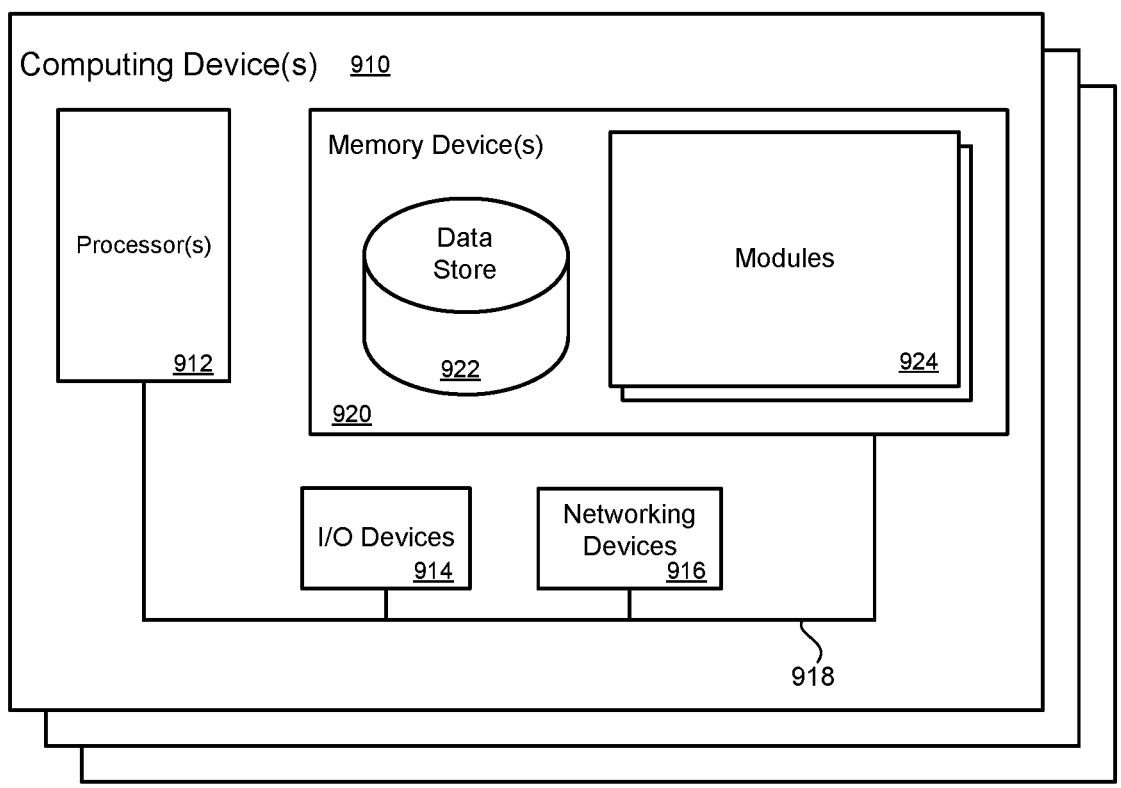
FIG. 9 is a block diagram that provides an example illustration of a computing device that may be employed in the present technology.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device may include a local communication interface 918 for the components in the computing device. For example, the local communication interface may be a local data bus and/or any related address or control busses as may be desired.

The memory device 920 may contain modules 924 that are executable by the processor(s) 912 and data for the modules 924. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen that is available to display output from the computing devices. Other known I/O device may be used with the computing device as desired. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer, and similar systems.

Figure 10:
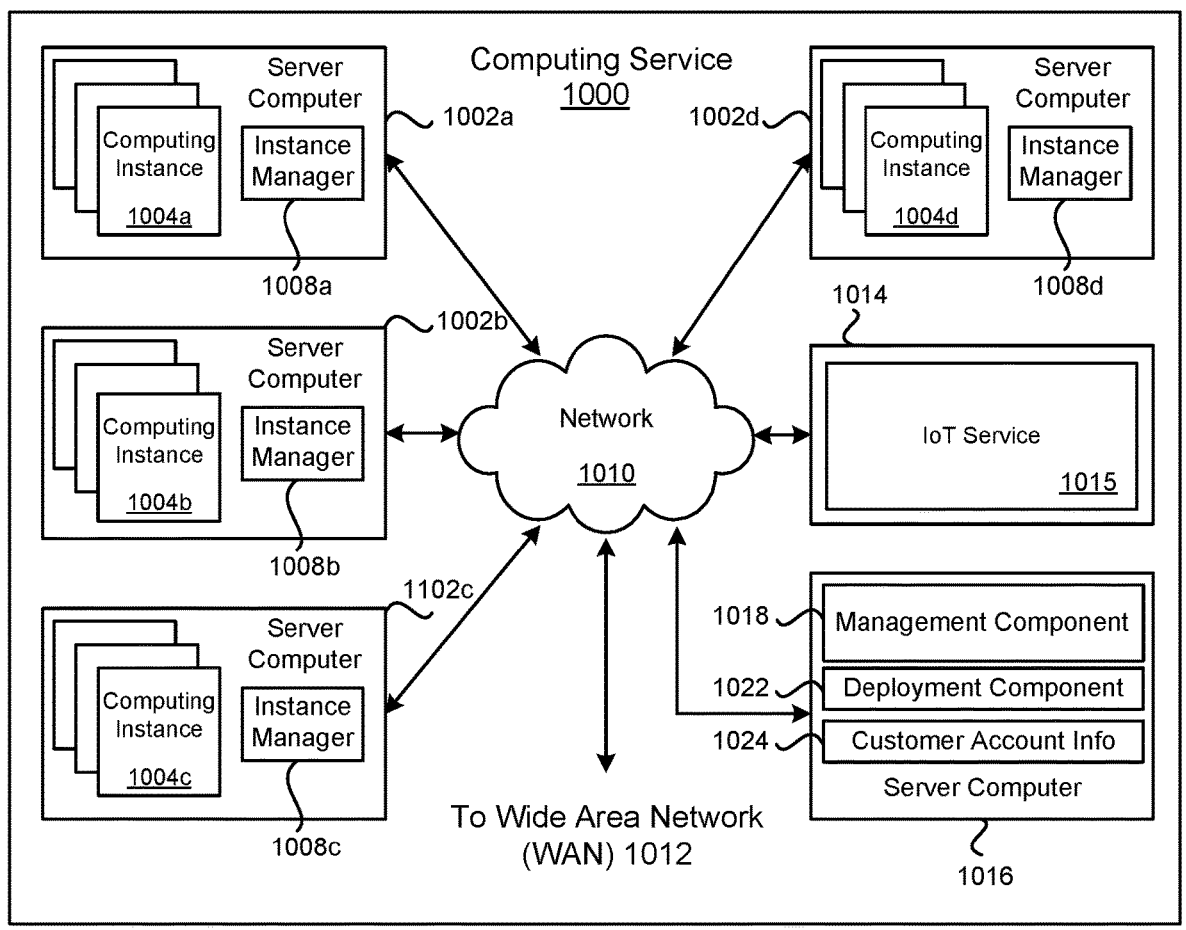
FIG. 10 is a block diagram of a computing service environment according to an example of the present technology.

FIG. 10 is a block diagram illustrating an example computing service 1000 that may be used to execute and manage a number of computing instances 1004a-d upon which the present technology may execute. In particular, the computing service 1000 depicted illustrates one environment in which the technology described herein may be used. The computing service 1000 may be one type of environment that includes various virtualized service resources that may be used, for instance, to host computing instances 1004a-d.

The computing service 1000 may be capable of delivery of computing, storage and networking capacity as a software service to a community of end recipients. In one example, the computing service 1000 may be established for an organization by or on behalf of the organization. That is, the computing service 1000 may offer a "private cloud environment." In another example, the computing service 1000 may support a multi-tenant environment, wherein a plurality of customers may operate independently (i.e., a public cloud environment). Generally speaking, the computing service 1000 may provide the following models: Infrastructure as a Service ("IaaS"), Platform as a Service ("PaaS"), and/or Software as a Service ("SaaS"). Other models may be provided. For the IaaS model, the computing service 1000 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 1000. End customers may access the computing service 1000 using networked client devices, such as desktop computers, laptops, tablets, smartphones, etc. running web browsers or other lightweight client applications, for example. Those familiar with the art will recognize that the computing service 1000 may be described as a "cloud" environment.

The particularly illustrated computing service 1000 may include a plurality of server computers 1002a-d. The server computers 1002a-d may also be known as physical hosts. While four server computers are shown, any number may be used, and large data centers may include thousands of server computers. The computing service 1000 may provide computing resources for executing computing instances 1004a-d. Computing instances 1004a-d may, for example, be virtual machines. A virtual machine may be an instance of a software implementation of a machine (i.e. a computer) that executes applications like a physical machine. In the example of a virtual machine, each of the server computers 1002a-d may be configured to execute an instance manager 1008a-d capable of executing the instances. The instance manager 1008a-d may be a hypervisor, virtual machine manager (VMM), or another type of program configured to enable the execution of multiple computing instances 1004a-d on a single server. Additionally, each of the computing instances 1004a-d may be configured to execute one or more applications.

A server 1014 may be reserved to execute software components for implementing the present technology or managing the operation of the computing service 1000 and the computing instances 1004a-d. For example, the server computer 1014 may execute an Internet of Things (IoT) service 1015. The IoT service 1015 may receive, from a first Internet of Things (IoT) device within a localized network, a request for a device capability. The device capability may be capable of providing IoT device data to an application that is executing on the first IoT device. The IoT service 1015 may access a registry of local device capabilities. The registry may include device capabilities for each of a plurality of IoT devices within the localized network. The IoT service 1015 may identify, from the registry of local device capabilities, a second IoT device within the localized network that possesses the device capability. The IoT service 1015 may forward the request for the device capability to the second IoT device. The second IoT device may be configured to connect to the first IoT device and send IoT device data in accordance with the device capability to the first IoT device, and the IoT device data may be consumed by the application executing on the first IoT device.

A server computer 1016 may execute a management component 1018. A customer may access the management component 1018 to configure various aspects of the operation of the computing instances 1004a-d purchased by a customer. For example, the customer may setup computing instances 1004a-d and make changes to the configuration of the computing instances 1004a-d.

A deployment component 1022 may be used to assist customers in the deployment of computing instances 1004a-d. The deployment component 1022 may have access to account information associated with the computing instances 1004a-d, such as the name of an owner of the account, credit card information, country of the owner, etc. The deployment component 1022 may receive a configuration from a customer that includes data describing how computing instances 1004a-d may be configured. For example, the configuration may include an operating system, provide one or more applications to be installed in computing instances 1004a-d, provide scripts and/or other types of code to be executed for configuring computing instances 1004a-d, provide cache logic specifying how an application cache is to be prepared, and other types of information. The deployment component 1022 may utilize the customer-provided configuration and cache logic to configure, prime, and launch computing instances 1004a-d. The configuration, cache logic, and other information may be specified by a customer accessing the management component 1018 or by providing this information directly to the deployment component 1022.

Customer account information 1024 may include any desired information associated with a customer of the multi-tenant environment. For example, the customer account information may include a unique identifier for a customer, a customer address, billing information, licensing information, customization parameters for launching instances, scheduling information, etc. As described above, the customer account information 1024 may also include security information used in encryption of asynchronous responses to API requests. By "asynchronous" it is meant that the API response may be made at any time after the initial request and with a different network connection.

A network 1010 may be utilized to interconnect the computing service 1000 and the server computers 1002a-d, 1016. The network 1010 may be a local area network (LAN) and may be connected to a Wide Area Network (WAN) 1012 or the Internet, so that end customers may access the computing service 1000. In addition, the network 1010 may include a virtual network overlaid on the physical network to provide communications between the servers 1002a-d. The network topology illustrated in FIG. 10 has been simplified, as many more networks and networking devices may be utilized to interconnect the various computing systems disclosed herein.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for sharing device capabilities between devices, the method comprising:
   identifying, at a first device in a localized network, a desired device capability to augment device capabilities of the first device;
   identifying, at the first device, a second device in the localized network that possesses the desired device capability using a registry of device capabilities stored on at least one of: the first device, a point of presence (POP) in the localized network or a service operating in a computing service environment; and
   obtaining, at the first device, access to the desired device capability of the second device indicated in the registry to augment the device capabilities of the first device.

2. The method of claim 1, further comprising:
   receiving, at the first device, device data captured at the second device in accordance with the desired device capability; and
   executing an application on the first device that consumes the device data.

3. The method of claim 1, wherein the registry includes the device capabilities for each of a plurality of devices in the localized network.

4. The method of claim 1, further comprising:
   sending a request for the desired device capability to a plurality of devices in the localized network when the registry of device capabilities does not identify devices that possess the desired device capability; and
   receiving a response from the second device indicating that the second device possesses the desired device capability.

5. The method of claim 1, further comprising:
   sending, from the first device, a request for the desired device capability to the second device when the registry of device capabilities indicates that the second device possesses the desired device capability; and
   resending the request to a plurality of devices in the localized network when the second device does not respond to the request from the first device in a predefined period of time.

6. The method of claim 1, further comprising:
   identifying, from the registry of device capabilities, that the second device executes an application capable of manipulating device data captured at the first device, wherein an ability to execute the application at the second device is the desired device capability;
   providing the device data to the second device for consumption at the application executing on the second device, wherein the application produces an output based on the device data; and
   receiving, from the second device, the output at the first device.

7. The method of claim 1, further comprising populating the registry of device capabilities based on device capability information received from a plurality of devices in the localized network.

8. The method of claim 1, wherein the desired device capability is one of: an image capturing capability, a video capturing capability, a microphone capability, a compute capability or a sensor capability.

9. The method of claim 1, wherein the desired device capability is at least one of a hardware capability or a software application capability.

10. A method for sharing device capabilities between devices, the method comprising:
    determining, at a first device in a localized network, a desired device capability to be performed on behalf of the first device;
    identifying a second device in the localized network that possesses the desired device capability using a registry of device capabilities stored on at least one of: the first device, a point of presence (POP) in the localized network or a service operating in a computing service environment;
    sending a request to the second device indicated in the registry to access the device capability of the second device to augment the device capabilities of the first device;
    receiving a response from the second device verifying that the second device possesses the device capability;
    receiving, at the first device, device data captured at the second device in accordance with the desired device capability; and
    executing an application on the first device that consumes the device data.

11. The method of claim 10, further comprising sending the device data captured at the second device to the POP in the localized network for processing of the device data.

12. The method of claim 10, further comprising sending the request to a plurality of devices in the localized network when the registry of device capabilities does not identify devices that possess the desired device capability, and the response is received from the second device.

13. The method of claim 10, further comprising:
    receiving multiple responses from multiple devices when the request is sent to a plurality of devices in the localized network, wherein the multiple responses include details regarding device capabilities of the multiple devices;
    assigning a fit score to each of the multiple devices based on the details regarding the device capabilities; and
    selecting one of the multiple devices to perform the device capability on behalf of the first device.

14. The method of claim 10, further comprising:
    receiving device capability information from a plurality of devices in the localized network; and
    populating the registry of device capabilities to reflect the device capability information, wherein the registry of device capabilities is updated to reflect new device capabilities or devices in the localized network that go offline.

15. The method of claim 10, wherein the desired device capability is one of: an image capturing capability, a video capturing capability, a microphone capability, a compute capability or a sensor capability.

16. The method of claim 10, wherein the desired device capability is at least one of a hardware capability or a software application capability.

17. A system for sharing device capability information, the system comprising:
- a processor;
- a memory device including a data store to store a plurality of data and instructions that, when executed by the processor, cause the processor to:
- determine, at a first device in a localized network, a desired device capability to be performed on behalf of the first device;
- access a registry of device capabilities that includes device capabilities for each of a plurality of devices in the localized network, wherein the registry of device capabilities is stored on at least one of: the first device, a point of presence (POP) in the localized network or a service operating in a computing service environment;
- determine that the registry of device capabilities does not indicate a device in the localized network that possesses the desired device capability;
- send a request for the desired device capability to the plurality of devices in the localized network;
- receive a response from a second device in the localized network indicating that the second device possesses the desired device capability; and
- update the registry of device capabilities to reflect that the second device possesses the desired device capability.

18. The system of claim 17, wherein the plurality of data and instructions, when executed by the processor, cause the processor to:
- receive device data captured at the second device in accordance with the desired device capability; and
- execute an application on the first device that consumes the device data.

19. The system of claim 17, wherein the desired device capability is one of: an image capturing capability, a video capturing capability, a microphone capability, a compute capability, a speaker capability, a capability to execute a certain type of application, or a sensor capability.

20. The system of claim 17, wherein the plurality of data and instructions, when executed by the processor, cause the processor to:
- receive device capability information from the plurality of devices in the localized network; and
- populating the registry of device capabilities to reflect the device capability information, wherein the registry of device capabilities is updated to reflect new device capabilities or devices in the localized network that go offline.

* * * * *